C. S. GURR.
LICENSE TAG.
APPLICATION FILED MAY 9, 1921.
1,401,977. Patented Jan. 3, 1922.
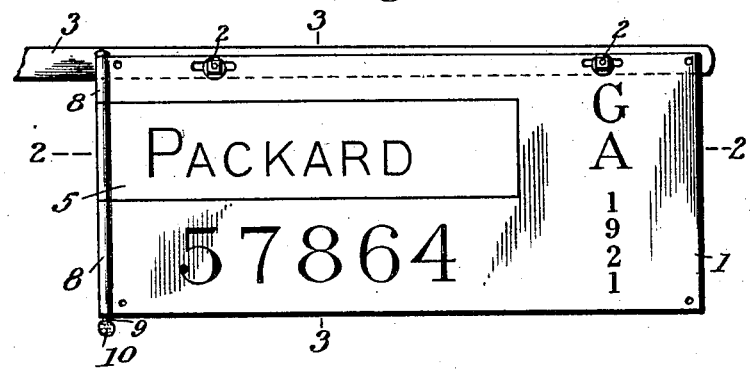
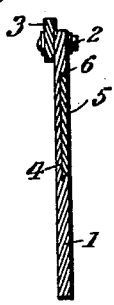
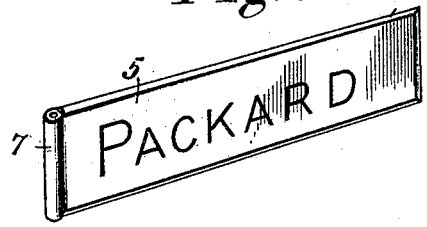
Inventor
Charles S. Gurr
By William J. Jacobi
Attorney

UNITED STATES PATENT OFFICE.

CHARLES S. GURR, OF VIENNA, GEORGIA.

LICENSE TAG.

1,401,977.   Specification of Letters Patent.   Patented Jan. 3, 1922.

Application filed May 9, 1921. Serial No. 467,827.

*To all whom it may concern:*

Be it known that I, CHARLES S. GURR, a citizen of the United States, residing at Vienna, in the county of Dooly and State of Georgia, have invented certain new and useful Improvements in License Tags, of which the following is a specification.

This invention relates to new and useful improvements in automobile license tags, and the primary object of the invention is to provide a tag composed of two elements, one of which will indicate the make of the car to which the tag is to be applied.

A further object of the invention is to provide such a license tag as will prevent the interchanging of tags to various makes of cars which causes the State loss of revenue.

Still another object of the invention is to provide a tag of this character which will enable the public and police departments to detect the theft of cars when tags have been interchanged.

With these and other objects in view, my invention consists in the novel features of construction, combination and arrangements of parts as will be hereinafter more fully described and pointed out in the claim.

In the accompanying drawings forming a part of this application—

Figure 1 is a front elevation of my improved license tag;

Fig. 2 is a transverse section therethrough as seen on the line 2—2 of Fig. 1;

Fig. 3 is a similar view as seen on the line 3—3 of Fig. 1;

Fig. 4 is a perspective view of an element of the tag removed; and

Fig. 5 is a perspective view of the pin or pintle used for securing the removable element to the license tag proper.

In describing the invention I shall refer to the drawings in which similar reference characters designate corresponding parts throughout the several views, and in which 1 designates a license tag of an automobile which is secured as shown at 2 to the frame 3 of the machine. Appearing on this license tag is a number, the State in which the license was obtained and the year, as customary in connection with all license tags for automobiles.

In the majority of States it is customary also to issue tags for a particular car for a certain year and the charge for such license tags varies according to the horse-power of the particular car for which the license is obtained. Ordinarily all that appears on the license tag is the number, the State in which the same is issued, and the year. Under this system, there is no way to detect when this license tag may be removed from one car and applied to another, either when a car is stolen, or when an unscrupulous citizen desires to cheat the State from revenues when he has purchased a new car, or by applying the license of a car of small horse-power to one of greater horse-power.

In order to obviate these difficulties I desire to provide a tag which will disclose thereon the name of the make of the car so that in the event the tag were to be interchanged to a car of a different make, it would be readily detected. To this end the tag 1 is provided with a dove-tail channel 4 which extends to the one end of the tag, and adapted to be inserted in this channel is an auxiliary plate 5 which is adapted to have printed thereon the make of the car for which the license tag is issued. This plate has its edges beveled as shown at 6 to fit snugly in the dove-tail channel 4, and the outer end of the plate is provided with a knuckle 7 which is adapted to align itself with knuckles 8 formed on the one end of the plate 1. The State license bureau will be provided with these auxiliary plates 5 having printed or otherwise inscribed the names of the various makes of cars, and when an owner applies for a license for his machine, a plate will be issued with a license tag bearing thereon the name of his particular car. The license bureau will insert the plate in the tag and a pin or pintle 9 is provided to be inserted in the aligning knuckles 7 and 8, the end of the pin or pintle being sealed as at 10 with the State seal. If this seal is at any time broken the same may be detected quite readily by officers of the law and others who may report the fact.

Through this medium persons will be required to obtain a license for each car that they may own which will eliminate the interchangeability of license tags, which often occurs under the present system and when a car is stolen an unauthorized tag may not be readily applied thereto, as now is the case, so that the stolen car may be recovered quite quickly.

From the foregoing description of the construction of my improved license tag, it will be seen that I have provided a simple, inexpensive and efficient means for carrying out the objects of the invention.

While I have particularly described the elements best adapted to perform the functions set forth, it is obvious that various changes in the form, proportion and in the minor details of construction may be resorted to without departing from the spirit or sacrificing any of the principles of the invention.

Having thus described my invention, what I claim is:

An automobile license tag comprising a main plate having a channel cut in the front face from one end thereof, a pair of knuckles formed at the one end of said plate on opposite sides of said channel, an auxiliary plate adapted for introduction into said channel and provided with an additional knuckle adapted to be aligned vertically with the aforesaid knuckles, and a pintle adapted to be inserted through said aligning knuckles and sealed in place.

In testimony whereof I affix my signature.

CHARLES S. GURR.